US012795087B2

(12) United States Patent
Lv et al.

(10) Patent No.: US 12,795,087 B2
(45) Date of Patent: Nov. 10, 2026

(54) LOOP FILTERING METHOD AND TERMINAL

(71) Applicant: VIVO MOBILE COMMUNICATION CO., LTD., Guangdong (CN)

(72) Inventors: Zhuoyi Lv, Guangdong (CN); Fei Qin, Guangdong (CN); Chuan Zhou, Guangdong (CN); Jinrong Zhang, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 167 days.

(21) Appl. No.: 18/744,113

(22) Filed: Jun. 14, 2024

(65) Prior Publication Data

US 2024/0340464 A1 Oct. 10, 2024

Related U.S. Application Data

(63) Continuation of application No. PCT/CN2022/141046, filed on Dec. 22, 2022.

(30) Foreign Application Priority Data

Dec. 28, 2021 (CN) ........................ 202111630318.4
Jul. 11, 2022 (CN) ........................ 202210853644.X

(51) Int. Cl.
*H04N 19/117* (2014.01)
*H04N 19/119* (2014.01)
(Continued)

(52) U.S. Cl.
CPC ......... *H04N 19/117* (2014.11); *H04N 19/119* (2014.11); *H04N 19/172* (2014.11);
(Continued)

(58) Field of Classification Search
CPC .................................................... H04N 19/117
See application file for complete search history.

(56) References Cited

U.S. PATENT DOCUMENTS 6,456,328 B1 9/2002 Okada
2013/0034159 A1 2/2013 Siekmann et al.
(Continued)

FOREIGN PATENT DOCUMENTS

CN 113392315 A 9/2021
CN 113518229 A 10/2021
(Continued)

OTHER PUBLICATIONS

European Search Report for Application No. 22914485.2, Mar. 26, 2025, 12 pages.

(Continued)

*Primary Examiner* — Jerry T Jean Baptiste
(74) *Attorney, Agent, or Firm* — Perilla Knox & Hildebrandt LLP; Kenneth A. Knox

(57) ABSTRACT

A loop filtering method and a terminal. The loop filtering method in the embodiments of this application includes: obtaining, by an electronic device, semantic block information of a picture to be filtered; determining, based on the semantic block information, at least one semantic block included in the picture to be filtered; and performing, for each semantic block by using a filter corresponding to the semantic block, loop filtering processing on a first reconstruction value corresponding to the semantic block, to obtain a second reconstruction value corresponding to the semantic block.

20 Claims, 5 Drawing Sheets

(51) Int. Cl.

| | |
|---|---|
| ***H04N 19/172*** | (2014.01) |
| ***H04N 19/176*** | (2014.01) |
| ***H04N 19/70*** | (2014.01) |
| ***H04N 19/82*** | (2014.01) |

(52) U.S. Cl.
CPC ........... *H04N 19/176* (2014.11); *H04N 19/70* (2014.11); *H04N 19/82* (2014.11)

(56) References Cited

U.S. PATENT DOCUMENTS

| | | | |
|---|---|---|---|
| 2013/0235926 A1 | 9/2013 | Wan et al. | |
| 2021/0021859 A1 | 1/2021 | Kuusela et al. | |
| 2021/0067773 A1* | 3/2021 | Peng | H04N 19/176 |
| 2021/0274170 A1 | 9/2021 | Du et al. | |
| 2024/0114185 A1* | 4/2024 | Kalva | H04N 19/90 |

FOREIGN PATENT DOCUMENTS

| | | |
|---|---|---|
| WO | 2011127961 A1 | 10/2011 |
| WO | 2021162359 A1 | 8/2021 |
| WO | 2021239224 A1 | 12/2021 |
| WO | 2021244884 A1 | 12/2021 |

OTHER PUBLICATIONS

International Search Report and Written Opinion for PCT Application No. PCT/CN2022/141046, Mailed Mar. 3, 2023, 11 pages.
First Chinese Office Action for Chinese Application No. 202210853644.X mailed May 21, 2025. 31 pages.

* cited by examiner

LOOP FILTERING METHOD AND TERMINAL

CROSS-REFERENCE TO RELATED APPLICATIONS

This application is a continuation of International Application No. PCT/CN2022/141046 filed on Dec. 22, 2022, which claims priority to Chinese Patent Application No. 202111630318.4 filed on Dec. 28, 2021, and to Chinese Patent Application No. 202210853644.X filed on Jul. 11, 2022, which are incorporated herein by reference in their entireties.

TECHNICAL FIELD

This application pertains to the field of video compression technologies, and in particular, to a loop filtering method and a terminal.

BACKGROUND

In the process of video compression encoding and decoding, the loop filtering method can be used to improve the quality of the picture and reduce the bit rate of the picture by filtering the picture, so as to realize video compression.

At present, in the loop filtering method, a filter is determined based on a bit rate point corresponding to the picture, and the filter is used to filter the picture. However, picture features extracted by the filter determined in the above method are not accurate enough, which further reduces the encoding and decoding efficiency in the video compression process.

SUMMARY

According to a first aspect, a loop filtering method is provided, and the method includes:

- obtaining, by an electronic device, semantic block information of a picture to be filtered;
- determining, based on the semantic block information, at least one semantic block included in the picture to be filtered; and
- performing, for each semantic block by using a filter corresponding to the semantic block, loop filtering processing on a first reconstruction value corresponding to the semantic block, to obtain a second reconstruction value corresponding to the semantic block.

According to a second aspect, a loop filtering apparatus is provided, including:

- a first obtaining module, configured to obtain semantic block information of a picture to be filtered;
- a first determining module, configured to determine, based on the semantic block information, at least one semantic block included in the picture to be filtered; and
- a first filtering module, configured to perform, for each semantic block by using a filter corresponding to the semantic block, loop filtering processing on a first reconstruction value corresponding to the semantic block, to obtain a second reconstruction value corresponding to the semantic block.

According to a third aspect, a terminal is provided. The terminal includes a processor and a memory, the memory stores a program or an instruction that can be run on the processor, and the program or the instruction is executed by the processor to implement steps of the method according to the first aspect.

According to a fourth aspect, a readable storage medium is provided. The readable storage medium stores a program or an instruction, and the program or the instruction is executed by a processor to implement steps of the method according to the first aspect.

According to a fifth aspect, a chip is provided. The chip includes a processor and a communications interface, the communications interface is coupled to the processor, and the processor is configured to run a program or an instruction to implement the method according to the first aspect.

According to a sixth aspect, a computer program product is provided. The computer program product is stored in a storage medium, and the computer program product is executed by at least one processor to implement steps of the method according to the first aspect.

According to a seventh aspect, an electronic device is provided, and is configured to perform steps of the method according to the first aspect.

DETAILED DESCRIPTION

Figure 1:
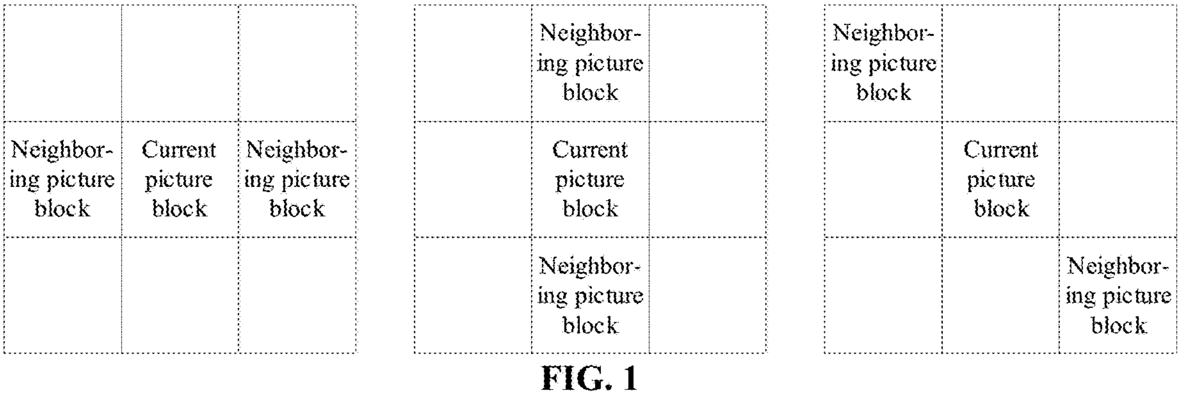
FIG. 1 is a schematic diagram of application of an existing loop filter.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms “first”, “second”, and the like in this specification and claims of this application are used to distinguish between similar objects instead of describing a specific order or sequence. It should be understood that, the terms used in such a way are interchangeable in proper circumstances, so that the embodiments of this application can be implemented in an order other than the order illustrated or described herein. Objects classified by “first” and “second” are usually of a same type, and the number of objects is not limited. For example, there may be one or more first objects. In addition, in the description and the claims, "and/or" represents at least one of connected objects, and a character "/" generally represents an "or" relationship between associated objects.

The loop filtering apparatus corresponding to the loop filtering method in the embodiments of this application may be a terminal. The terminal may also be referred to as a terminal device or user equipment (UE). The terminal may be a terminal side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), an augmented reality (AR)/virtual reality (VR) device, a robot, a wearable device, vehicle user equipment (VUE), pedestrian user equipment (PUE), a smart home (a home device with a wireless communication function, such as a refrigerator, a television, a washing machine, or furniture), a game console, a personal computer (PC), a teller machine, or a self-service machine, and the wearable device includes a smart watch, a smart band, smart earphones, smart glasses, smart jewelry (a smart bracelet, a smart hand chain, a smart ring, a smart necklace, a smart bangle, a smart anklet, or the like), a smart wristband, smart clothes, and the like. It should be noted that a specific type of the terminal is not limited in the embodiments of this application.

For ease of understanding, the following describes some content in the embodiments of this application.

In the existing video compression technology, the following two loop filters are used to perform loop filtering on a reconstruction value of the picture.

The first loop filter is a loop filter including a deblocking filter, a sample adaptive migration module, and an adaptive in-loop filtering module.

The deblocking filter calculates the boundary strength based on a reconstruction value of a boundary pixel of a neighboring picture block in the picture, and sets a filter coefficient of the deblocking filter based on the boundary strength, and then uses the deblocking filter to filter the picture to eliminate discontinuity of boundary pixels in the picture.

The sample adaptive migration module is used to compensate local information in different areas of the picture after eliminating the discontinuity of boundary pixels in the picture, so as to reduce the distortion between the original picture and a reconstructed picture. Specifically, sample adaptive migration includes 2 ways: boundary compensation and strip compensation.

Boundary compensation refers to classifying the current picture block based on the reconstruction value of the current picture block and the reconstruction value of the neighboring picture block in the picture, and compensating the reconstruction value of the current picture block of the same category by the same value. Referring to FIG. 1, a positional relationship between the neighboring picture block and the current picture block can be shown in FIG. 1.

Strip compensation refers to partitioning the current picture block into 32 strips with the same size based on a pixel range of the current picture block in the picture, and compensating pixels in the same strip with the same pixel value.

Figure 2:
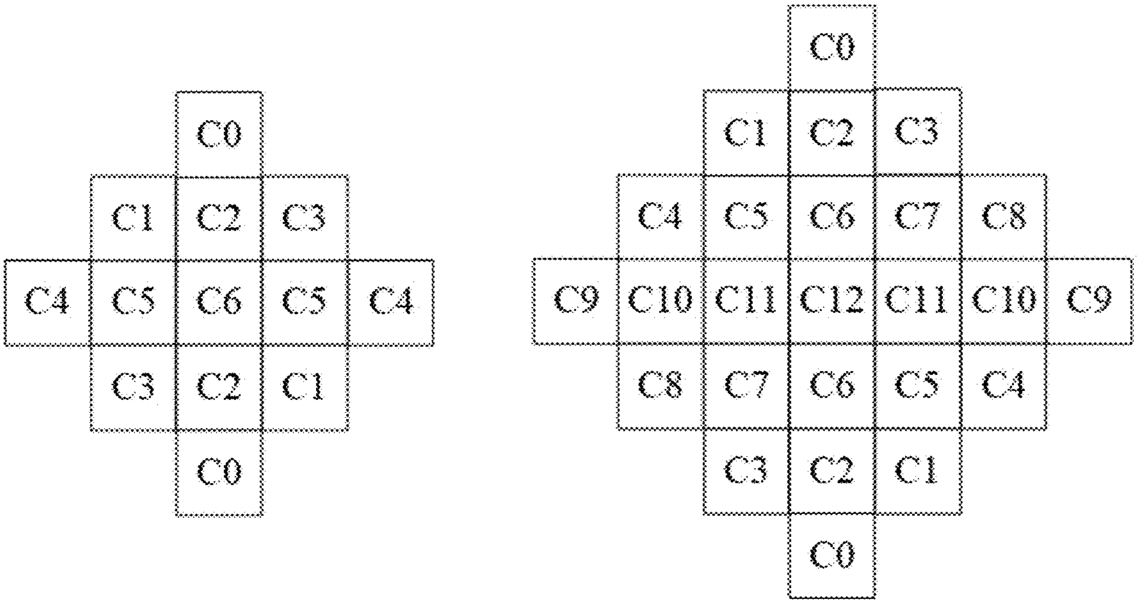
FIG. 2 is a schematic diagram of application of an existing loop filter.

The adaptive in-loop filtering module is used to determine the filter corresponding to the current picture block based on the gradient characteristics of pixels in the current picture block after compensating the pixel value of the picture, and then use the filter to filter the picture. For example, referring to FIG. 2, it should be understood that when the current picture block is a chroma block, a filter with a size of 5*5 shown in FIG. 2 is used. When the current picture block is a luminance block, a filter with a size of 7*7 shown in FIG. 2 is used.

The second loop filter is a loop filter based on the neural network. At present, the loop filter based on the neural network determines the filter based on a bit rate point corresponding to the picture, and the filter is used to filter the picture.

However, the first loop filter determines the filter corresponding to the current picture block based on the gradient characteristics of pixels in the current picture block. For areas with different semantic types in the current picture block, the same filter may be used for processing, which leads to picture features extracted by the filter are not accurate enough. The second loop filter determines the filter based on the bit rate point corresponding to the picture. For areas with different semantic types in the current picture block, the same filter may be used for processing, which leads to picture features extracted by the filter are not accurate enough. Therefore, picture features extracted by the filter determined in the above method are not accurate enough, which further reduces the encoding and decoding efficiency in the video compression process.

To resolve the foregoing possible technical problem, this embodiment of this application provides a loop filtering method. With reference to the accompanying drawings, the loop filtering method provided in the embodiments of this application is described in detail by using some embodiments and application scenarios thereof.

Figure 3:
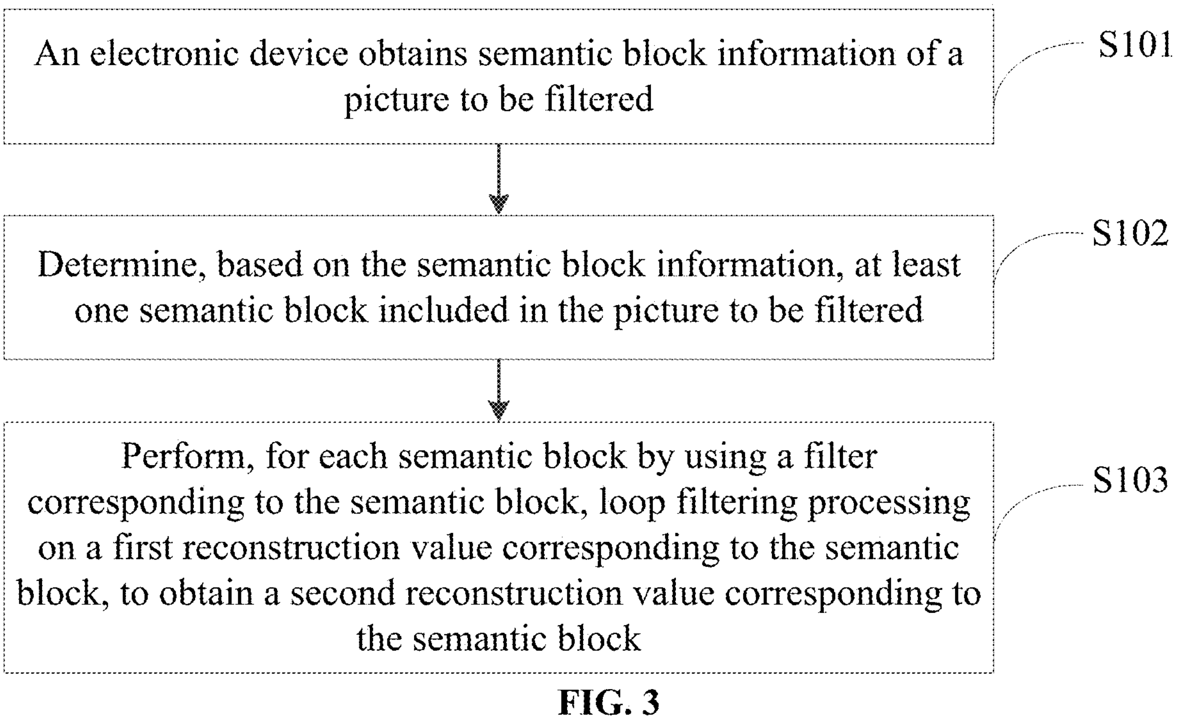
FIG. 3 is a flowchart of a loop filtering method according to an embodiment of this application.

Referring to FIG. 3, FIG. 3 is a flowchart of a loop filtering method according to an embodiment of this application. The loop filtering method provided in this embodiment includes the following steps.

S101. An electronic device obtains semantic block information of a picture to be filtered.

The loop filtering method provided in this embodiment of this application can be applied to an electronic device, and the electronic device obtains semantic block information of the picture to be filtered. The semantic block can be understood as a sub-block in the picture to be filtered, one piece of semantic block information corresponds to one semantic block, and the semantic block information is preset information related to the corresponding semantic block.

S102. Determine, based on the semantic block information, at least one semantic block included in the picture to be filtered.

In this step, after semantic block information is obtained, the semantic block information is parsed, and at least one semantic block included in the picture to be filtered is determined based on content represented by the semantic block information. When the picture to be filtered corresponds to one unique semantic, the picture to be filtered is determined as one semantic block. For the specific technical scheme of how to determine at least one semantic block included in the picture to be filtered, please refer to the subsequent embodiments.

S103. Perform, for each semantic block by using a filter corresponding to the semantic block, loop filtering processing on a first reconstruction value corresponding to the semantic block, to obtain a second reconstruction value corresponding to the semantic block.

In this step, after the semantic block corresponding to the picture to be filtered is determined, the semantic type and the first reconstruction value corresponding to each semantic block are obtained. The filter corresponding to the semantic block can be determined based on the semantic type. Further, the filter is used to perform loop filtering processing on the first reconstruction value corresponding to the semantic block, to obtain the second reconstruction value corresponding to the semantic block, so as to filter the picture to be filtered.

Optionally, a first identifier indicating the semantic type is preset, and by obtaining a first identifier corresponding to each semantic block, the semantic type corresponding to the semantic block can be determined.

In an optional implementation, the number of the semantic types is defined as C, the value range of the first identifier is set from 0 to C−1, and one first identifier corresponds to one semantic type, that is, the semantic type is a single semantic type.

For example, if there are 5 semantic types: vehicles, roads, overpasses, plants, and pedestrians, 5 first identifiers can be set, and each first identifier corresponds to one semantic type.

In another optional implementation, the semantic type is a hybrid semantic type, the number of hybrid semantic types is defined as D, the value range of the first identifier is set from C to (D+C−1), and one first identifier corresponds to one hybrid semantic type.

For example, if there are 3 hybrid semantic types: vehicles and roads, vehicles and pedestrians, and roads and pedestrians, 3 first identifiers can be set, and each first identifier corresponds to one hybrid semantic type.

In this embodiment of this application, the electronic device obtains semantic block information of a picture to be filtered; determines, based on the semantic block information, at least one semantic block included in the picture to be filtered; and performs, for each semantic block by using a filter corresponding to the semantic block, loop filtering processing on a first reconstruction value corresponding to the semantic block, to obtain a second reconstruction value corresponding to the semantic block, where the filter is determined based on the semantic type of the corresponding semantic block. In this embodiment of this application, the semantic block in the picture to be filtered is determined based on the semantic block information of the picture to be filtered. For each semantic block, based on the semantic type corresponding to the semantic block, the filter corresponding to the semantic block is used to perform loop filtering processing on the first reconstruction value corresponding to the semantic block, so as to realize loop filtering of the picture to be filtered. To be specific, in this embodiment of this application, corresponding filters are used to filter semantic blocks of different semantic types, instead of using the same filter to filter, so as to improve the accuracy of picture feature extraction, and further improve the encoding and decoding efficiency in the video compression process.

Optionally, the determining, based on the semantic block information, at least one semantic block included in the picture to be filtered includes:

- obtaining at least one picture block by partitioning the picture to be filtered; and
- determining the picture block as the semantic block.

The semantic block information includes first size information. As a possible implementation, the first size information is used to represent a size of the largest semantic block in the picture to be filtered.

In this embodiment, the picture to be filtered is partitioned into at least one picture block, and the picture block is determined as a semantic block, where a size of the picture block is the same as that represented by the first size information. It should be understood that a specific partition manner of the picture to be filtered is not limited in this embodiment.

For example, in a case that the size of the picture to be filtered is 128*128, and the size represented by the first size information is 64*64, quadtree partition may be performed on the picture to be filtered, to obtain 4 picture blocks with the size of 64*64, and the above picture blocks are determined as semantic blocks.

In other embodiments, if the size of the picture to be filtered is less than or equal to the size represented by the first size information, the picture to be filtered can be determined as one semantic block.

In this embodiment, the first size information included in the semantic block information is used to determine the semantic block corresponding to the picture to be filtered, and then loop filtering processing is performed on the first reconstruction value corresponding to the semantic block based on the filter corresponding to the semantic block, so as to improve the encoding and decoding efficiency in the video compression process.

Optionally, after the obtaining at least one picture block, the method further includes:

- obtaining sub-blocks by partitioning the first picture block; and
- determining the sub-block as the semantic block.

The semantic block information further includes second size information associated with the first picture block, where the first picture block is a picture block associated with the second size information. As a possible implementation, the second size information is used to represent a size of the smallest semantic block in the picture to be filtered.

In this embodiment, after obtaining at least one picture block, the first picture block is partitioned to obtain sub-blocks, and the sub-blocks are determined as semantic blocks. The size of the sub-block is greater than or equal to the size represented by the second size information, and the specific partition mode is not limited in this embodiment.

Optionally, the obtaining sub-blocks by partitioning the first picture block includes:

- partitioning the first picture block by using the N-branch tree partition manner until a partition depth corresponding to the sub-block obtained by partition is the same as a preset partition depth.

The semantic block information further includes an N-branch tree partition manner associated with the first picture block.

In this embodiment, the N-branch tree partition manner in the semantic block information may be used to partition the first picture block until a partition depth corresponding to the sub-block obtained by partition is the same as a preset partition depth. The preset partition depth may be a partition depth represented by partition depth information included in the semantic block information.

Specifically, every time the first picture block is partitioned by using the N-branch tree partition manner, a size relationship between the size of the sub-block obtained by partition and the size represented by the second size information is determined. If the size of the sub-block is larger than the size represented by the second size information, the N-branch tree partition manner is continued to be used to partition the sub-block; and if the size of the sub-block is equal to the size represented by the second size information, sub-block partition is stopped.

The N-branch tree partition manner can be indicated in the form of partition identifier, and the N-branch tree partition manner includes but is not limited to quadtree partition, ternary tree partition, or binary tree partition.

In an optional embodiment, the first picture block can be partitioned by using the N-branch tree partition manner to obtain sub-blocks with the same size.

Figure 4:
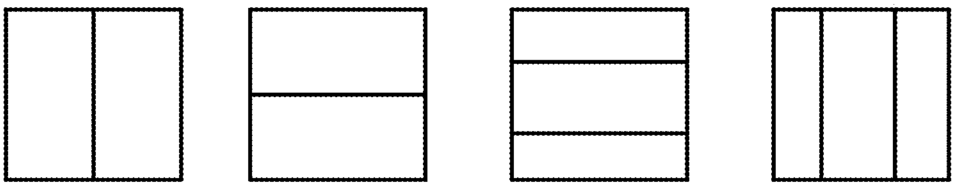
FIG. 4 is a first schematic diagram of application of a loop filtering method according to an embodiment of this application.

For example, referring to FIG. 4, the partition manner shown in FIG. 4 may be used to perform ternary tree partition or binary tree partition on the first picture block, to obtain sub-blocks with the same area.

In another optional embodiment, the first picture block can be partitioned by using the N-branch tree partition manner to obtain sub-blocks with different sizes.

Figure 5:
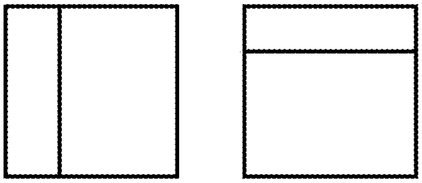
FIG. 5 is a second schematic diagram of application of a loop filtering method according to an embodiment of this application.

For example, referring to FIG. 5, the partition manner shown in FIG. 5 may be used to perform binary tree partition on the first picture block, to obtain sub-blocks with different areas.

Figure 6:
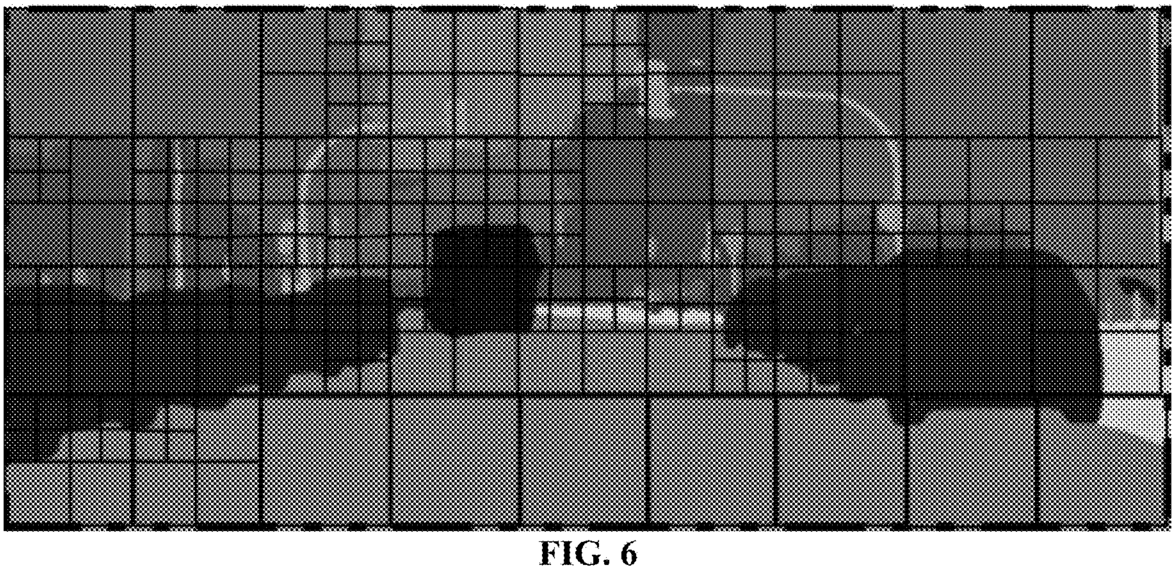
FIG. 6 is a third schematic diagram of application of a loop filtering method according to an embodiment of this application.

For example, referring to FIG. 6, FIG. 6 is a schematic diagram of a sub-block obtained after a picture to be filtered is partitioned by using an N-branch tree partition manner.

In this embodiment, the first picture block is partitioned by using the second size information and the N-branch tree partition manner that are associated with the first picture block, so as to determine the semantic block corresponding to the picture to be filtered, and then loop filtering processing is performed on the first reconstruction value corresponding to the semantic block based on the filter corresponding to the semantic block, so as to improve the encoding and decoding efficiency in the video compression process.

Optionally, in a case that the electronic device is a decoding end, the obtaining semantic block information of a picture to be filtered includes:

obtaining a semantic information bitstream; and parsing the semantic information bitstream to obtain semantic block information of the picture to be filtered.

In this embodiment, in a case that the electronic device is a decoding end, that is, in the process of decoding the video, the semantic information bitstream is obtained, and the semantic information bitstream is parsed to obtain the semantic block information of the picture to be filtered. The semantic information bitstream is a data stream encoding semantic block information of an original picture corresponding to the picture to be filtered; and the semantic block information includes the first size information, and the second size information and the N-branch tree partition manner that are associated with the first picture block. In other embodiments, the semantic block information can be written into the video bitstream, and the video bitstream can be parsed to obtain the semantic block information in the process of decoding the video.

Optionally, in a case that the electronic device is an encoding end, the obtaining semantic block information of a picture to be filtered includes:

obtaining an original picture; and performing semantic segmentation processing on the original picture to determine semantic block information of the original picture, where the semantic block information of the original picture is the same as the semantic block information of the picture to be filtered.

In this embodiment, in a case that the electronic device is the encoding end, that is, in the process of encoding the video, the semantic block information can be compiled into semantic information bitstream, and the semantic information bitstream and the video bitstream can be transmitted and parsed separately.

In an optional implementation, different bitstream identifiers can be added to the semantic information bitstream and the video bitstream to distinguish the two bitstreams, for example, a bitstream identifier of the semantic information bitstream is 1, and a bitstream identifier of the video bitstream is 0.

Figure 7:
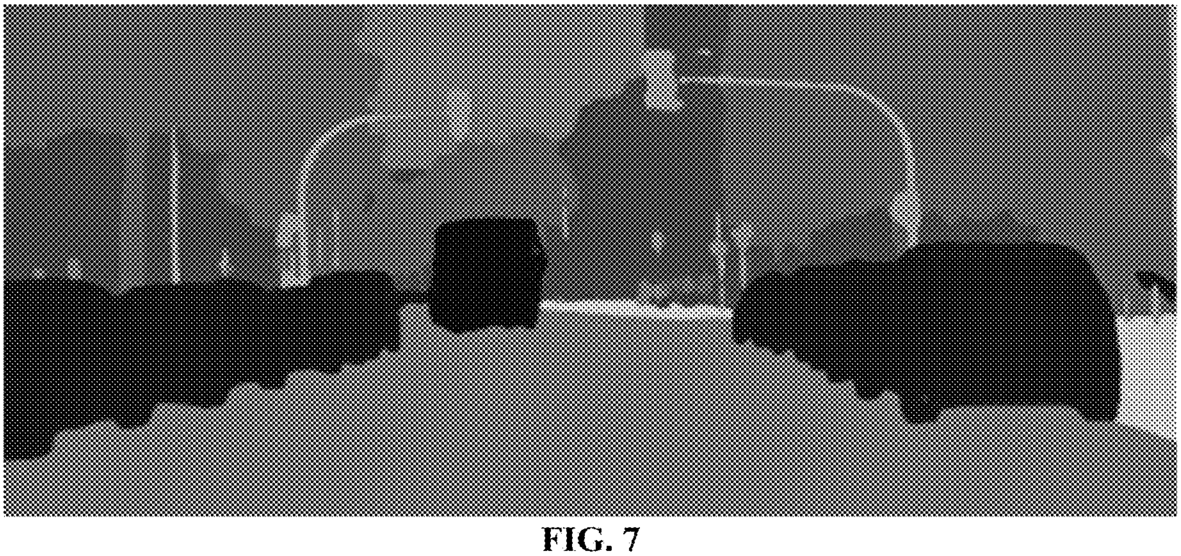
FIG. 7 is a fourth schematic diagram of application of a loop filtering method according to an embodiment of this application.

In this embodiment, the original picture is obtained, where the original picture is a picture obtained in a case that the picture to be filtered is not preprocessed. The preprocessing includes, but is not limited to, spatial transformation, noise reduction, and the like. Semantic segmentation processing is performed on the original picture to determine semantic block information of the original picture. Optionally, referring to FIG. 7, FIG. 7 shows a semantically segmented picture obtained after semantic segmentation processing is performed on the original picture by using a semantic segmentation neural network. Picture features of semantically identical areas in the semantically segmented picture can be extracted to obtain semantic block information of the original picture.

It should be understood that the semantic block information of the original picture is the same as the semantic block information of the picture to be filtered.

Optionally, the performing, by using a filter corresponding to the semantic block, loop filtering processing on a first reconstruction value corresponding to the semantic block, to obtain a second reconstruction value corresponding to the semantic block includes:

performing, by using a first target filter, loop filtering processing on a first reconstruction value corresponding to the semantic block, to obtain a second reconstruction value corresponding to the semantic block, where the first target filter is associated with the picture to be filtered. In this embodiment, if the picture to be filtered corresponds to one semantic type, that is, semantic types corresponding to all semantic blocks in the picture to be filtered are the same, the first target filter associated with the picture to be filtered can be used to perform loop filtering on a first reconstruction value corresponding to each semantic block, so as to obtain a second reconstruction value corresponding to each semantic block.

Optionally, before the performing, for each semantic block by using a filter corresponding to the semantic block, loop filtering processing on a first reconstruction value corresponding to the semantic block, to obtain a second reconstruction value corresponding to the semantic block, the method further includes:

obtaining scenario information corresponding to the picture to be filtered and a semantic type and position information corresponding to each semantic block; and determining a filter and a first reconstruction value corresponding to the semantic block.

The semantic type corresponding to each semantic block can be represented by a first identifier, and the scenario information corresponding to the picture to be filtered can be represented by a second identifier.

In this embodiment, after at least one semantic block included in the picture to be filtered is determined, the second identifier corresponding to the picture to be filtered and the first identifier and position information corresponding to each semantic block are obtained. A reconstruction value of the pixel represented by the position information in the picture to be filtered can be determined as a reconstruction value of the semantic block corresponding to the position information. In this embodiment, the filter corresponding to the semantic block can be determined based on the second identifier and the first identifier corresponding to the semantic block.

Specifically, the second identifier can be used to represent the scenario information corresponding to the picture to be filtered, such as a traffic monitoring scenario, a video conference scenario, or a life scenario. It should be understood that if first identifiers corresponding to two picture blocks are the same, but corresponding second identifiers are different, different filters are used for the two picture blocks for loop filtering.

For example, the second identifier is 0, which represents the traffic monitoring scenario; or the second identifier is 1, which represents the video conference scenario. If the second identifier corresponding to the first semantic block is 0, and the first identifier is 1, it indicates that the semantics corresponding to the first semantic block refers to vehicles in the traffic monitoring scenario; and if the second identifier corresponding to the first semantic block is 1, and the first identifier is 1, it indicates that the semantics corresponding to the first semantic block refers to people in the video conference scenario. Although the first identifier corresponding to the first semantic block is the same as the first identifier corresponding to the second semantic block, the filter corresponding to the first semantic block is different from that corresponding to the second semantic block.

In this embodiment, different second identifiers are set based on the scenario corresponding to the picture to be filtered, and the filter corresponding to the picture block is determined based on the first identifier and the second identifier. When there are a large number of scenarios corresponding to the picture to be filtered, the filter corresponding to the picture block can be determined without setting a large number of first identifiers, thus reducing the memory space occupied by identifier information.

Optionally, the performing, by using a filter corresponding to the semantic block, loop filtering processing on a first reconstruction value corresponding to the semantic block, to obtain a second reconstruction value corresponding to the semantic block includes:

in a case that the semantic type of the semantic block is a first semantic type, performing, by using a first filter corresponding to the semantic block, loop filtering processing on a first reconstruction value corresponding to the semantic block, to obtain a second reconstruction value corresponding to the semantic block.

The first semantic type is a single semantic type, that is, the semantic block corresponds to only one kind of semantics. Optionally, the first filter is a filter trained based on a first training picture, and the first training picture includes training pictures with the same semantic type.

In this embodiment, in a case that the semantic type of the semantic block is a first semantic type, loop filtering processing is performed, by using a first filter corresponding to the semantic block, on a first reconstruction value corresponding to the semantic block, to obtain a second reconstruction value corresponding to the semantic block. Therefore, based on the number of semantic types corresponding to semantic blocks, corresponding filters are used for filtering, so as to improve the accuracy of picture feature extraction, and further improve the encoding and decoding efficiency in the video compression process.

Optionally, the performing, by using a filter corresponding to the semantic block, loop filtering processing on a first reconstruction value corresponding to the semantic block, to obtain a second reconstruction value corresponding to the semantic block includes:

in a case that the semantic type of the semantic block is a second semantic type, performing, by using a second filter corresponding to the semantic block, loop filtering processing on a first reconstruction value corresponding to the semantic block, to obtain a second reconstruction value corresponding to the semantic block.

The second semantic type is a hybrid semantic type, that is, the semantic block corresponds to a plurality of semantics. Optionally, the second filter is a filter trained based on a second training picture, and the second training picture includes training pictures with different semantic types.

In this embodiment, in a case that the semantic type of the semantic block is a second semantic type, loop filtering processing is performed, by using a second filter corresponding to the semantic block, on a first reconstruction value corresponding to the semantic block, to obtain a second reconstruction value corresponding to the semantic block. Therefore, based on the number of semantic types corresponding to semantic blocks, corresponding filters are used for filtering, so as to improve the accuracy of picture feature extraction, and further improve the encoding and decoding efficiency in the video compression process.

For ease of understanding, the process of obtaining the training data of the filter is briefly described below.

An original picture is obtained, and semantic segmentation processing is performed on the original picture to obtain a semantically segmented picture. For a specific manner of performing semantic segmentation on the original picture, refer to the above embodiment, and details are not described herein again.

Some pictures in the semantically segmented pictures belonging to the same semantic area are used as a first training picture. Some pictures in the semantically segmented pictures belonging to different semantic areas are used as a second training picture.

Further, the neural network in the filter is trained by using the first training picture to obtain a trained filter, and the filter is determined as the first filter; and the neural network in the filter is trained by using the second training picture to obtain a trained filter, and the filter is determined as the second filter. The process of training the neural network by using the first training picture or the second training picture is consistent with the existing training process of training the neural network, and details are not described herein again.

Optionally, the obtaining semantic block information of a picture to be filtered includes:

obtaining a filter identifier corresponding to the picture to be filtered; and in a case that the filter identifier is a preset identifier, obtaining the semantic block information of the picture to be filtered.

In this embodiment, a filter identifier corresponding to the picture to be filtered is preset. After the filter identifier corresponding to the picture to be filtered is obtained, if the filter identifier is a preset identifier, it indicates that the picture to be filtered is filtered by using the loop filtering method provided in this embodiment of this application, then the semantic block information of the picture to be filtered can be obtained, and filtering can be performed by using the loop filtering method provided in this embodiment of this application.

In other embodiments, based on the filter identifier, the loop filtering processing manner for the reconstruction value corresponding to the semantic block can further be determined.

Optionally, in the above case, if the filter identifier is 0, a loop filter including a deblocking filter, a sample adaptive migration module, and an adaptive in-loop filtering module is used to perform loop filtering processing on the first reconstruction value corresponding to the semantic block.

If the filter identifier is 1, a loop filter based on the neural network is used to perform loop filtering processing on the first reconstruction value corresponding to the semantic block.

The preset identifier is set to 2, and if the filter identifier is 2, at least one semantic block included in the picture to be filtered is determined based on the semantic block information of the picture to be filtered, and then for each semantic block, the filter corresponding to the semantic block is used to perform loop filtering processing on the first reconstruction value corresponding to the semantic block. To be specific, the loop filtering method provided in this embodiment of this application can be used to perform loop filtering processing on the picture to be filtered.

In other embodiments, the picture sequence of the picture to be filtered includes a filter identifier. In this case, for all pictures in the picture sequence, the filter corresponding to the filter identifier is used for loop filtering processing.

Optionally, in the above case, if the filter identifier is 0 or 1, a loop filter including a deblocking filter, a sample adaptive migration module, and an adaptive in-loop filtering module or a loop filter based on the neural network is used to perform loop filtering processing on the first reconstruction value corresponding to the semantic block.

If the filter identifier is 2, loop filtering processing can be performed on the picture to be filtered by using the loop filtering method provided in this embodiment of this application.

Optionally, the performing, by using a filter corresponding to the semantic block, loop filtering processing on a first reconstruction value corresponding to the semantic block, to obtain a second reconstruction value corresponding to the semantic block includes:

- performing, by using the third filter, loop filtering processing on the first reconstruction value, to obtain a third reconstruction value; and
- performing, by using the fourth filter, loop filtering processing on the third reconstruction value, to obtain the second reconstruction value.

In this embodiment, various loop filtering combinations can be used to perform loop filtering processing on the semantic block. The third filter or the fourth filter is determined based on the semantic type of the semantic block, that is, the filter in the prior art and the filter provided in this embodiment of this application are used to perform loop filtering processing on the first reconstruction value.

In an optional implementation, the third filter is determined based on the semantic type of the semantic block, and the fourth filter is a loop filter including a deblocking filter, a sample adaptive migration module, and an adaptive in-loop filtering module.

In another optional implementation, the third filter is determined based on the semantic type of the semantic block, and the fourth filter is a loop filter based on the neural network in the prior art.

In another optional implementation, the third filter is a loop filter including a deblocking filter, a sample adaptive migration module, and an adaptive in-loop filtering module, and the fourth filter is determined based on the semantic type of the semantic block.

In another optional implementation, the third filter is a loop filter based on the neural network in the prior art, and the fourth filter is determined based on the semantic type of the semantic block.

Optionally, the performing, by using a filter corresponding to the semantic block, loop filtering processing on a first reconstruction value corresponding to the semantic block, to obtain a second reconstruction value corresponding to the semantic block includes:

- input semantic type information corresponding to the semantic block and the first reconstruction value corresponding to the semantic block to a second target filter to obtain the second reconstruction value corresponding to the semantic block.

The semantic type information is used to represent the semantic type of the semantic block, and the second target filter is a preset neural network filter. In this embodiment, whether the semantic types corresponding to the semantic blocks are the same or not, the semantic type information and the first reconstruction value corresponding to each semantic block are input into the same filter, that is, the second target filter. For each semantic block, a neural network parameter in the second target filter is adjusted based on the semantic type information corresponding to the semantic block, and then loop filtering processing is performed on the first reconstruction value corresponding to the semantic block by using the adjusted second target filter, so as to obtain the second reconstruction value corresponding to each semantic block.

In this embodiment, for each semantic block, the neural network parameter in the second target filter is adjusted based on the semantic type corresponding to the semantic block, and loop filtering processing is performed on the first reconstruction value corresponding to the semantic block by using the adjusted second target filter to realize loop filtering on the picture to be filtered, thereby improving accuracy of picture feature extraction, and further improving the encoding and decoding efficiency in the video compression process.

The loop filtering method provided in this embodiment of this application may be executed by a loop filtering apparatus. In this embodiment of this application, the loop filtering apparatus provided in this embodiment of this application is described by using an example in which the loop filtering apparatus performs the loop filtering method.

Figure 8:
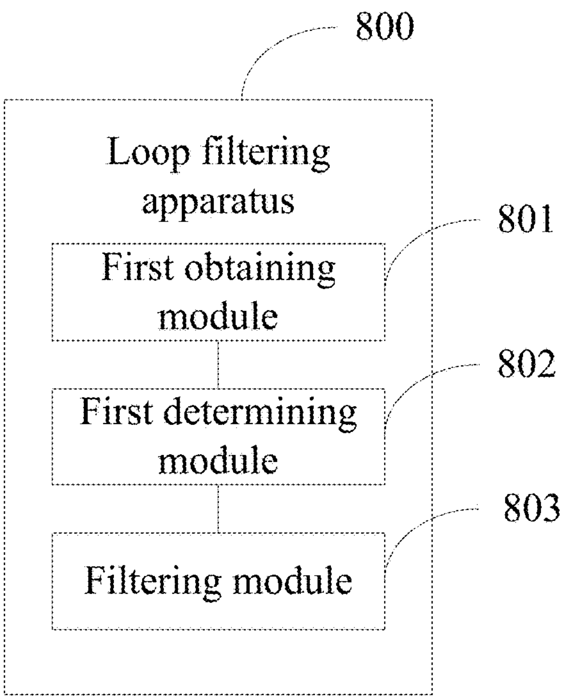
FIG. 8 is a structural diagram of a loop filtering apparatus according to an embodiment of this application.

As shown in FIG. 8, a loop filtering apparatus 800 includes:

- a first obtaining module 801, configured to obtain semantic block information of a picture to be filtered;
- a first determining module 802, configured to determine, based on the semantic block information, at least one semantic block included in the picture to be filtered; and
- a filtering module 803, configured to perform, for each semantic block by using a filter corresponding to the semantic block, loop filtering processing on a first reconstruction value corresponding to the semantic block, to obtain a second reconstruction value corresponding to the semantic block.

Optionally, the first determining module 802 is specifically configured to:

- obtain at least one picture block by partitioning the picture to be filtered; and
- determine the picture block as the semantic block.

Optionally, the first determining module 802 is further specifically configured to:

- obtain sub-blocks by partitioning the first picture block; and
- determine the sub-block as the semantic block.

Optionally, the first determining module 802 is further specifically configured to:

partition the first picture block by using the N-branch tree partition manner until a partition depth corresponding to the sub-block obtained by partition is the same as a preset partition depth.

Optionally, in a case that the loop filtering apparatus 800 is a decoding end, the first obtaining module 801 is specifically configured to:

obtain a semantic information bitstream; and parse the semantic information bitstream to obtain semantic block information of the picture to be filtered.

Optionally, in a case that the loop filtering apparatus 800 is an encoding end, the first obtaining module 801 is further specifically configured to:

obtain an original picture; and perform semantic segmentation processing on the original picture to determine semantic block information of the original picture.

Optionally, the filtering module 803 is specifically configured to:

perform, by using a first target filter, loop filtering processing on a first reconstruction value corresponding to the semantic block, to obtain a second reconstruction value corresponding to the semantic block.

Optionally, the loop filtering apparatus 800 further includes:

a second obtaining module, configured to obtain scenario information corresponding to the picture to be filtered and a semantic type and position information corresponding to each semantic block; and a second determining module, configured to determine a filter and a first reconstruction value corresponding to the semantic block.

Optionally, the filtering module 803 is further specifically configured to:

in a case that the semantic type of the semantic block is a first semantic type, perform, by using a first filter corresponding to the semantic block, loop filtering processing on a first reconstruction value corresponding to the semantic block, to obtain a second reconstruction value corresponding to the semantic block.

Optionally, the filtering module 803 is further specifically configured to:

in a case that the semantic type of the semantic block is a second semantic type, perform, by using a second filter corresponding to the semantic block, loop filtering processing on a first reconstruction value corresponding to the semantic block, to obtain a second reconstruction value corresponding to the semantic block.

Optionally, the first obtaining module 801 is further specifically configured to:

obtain a filter identifier corresponding to the picture to be filtered; and in a case that the filter identifier is a preset identifier, obtain the semantic block information of the picture to be filtered.

Optionally, the filtering module 803 is further specifically configured to:

perform, by using the third filter, loop filtering processing on the first reconstruction value, to obtain a third reconstruction value; and perform, by using the fourth filter, loop filtering processing on the third reconstruction value, to obtain the second reconstruction value.

Optionally, the filtering module 803 is further specifically configured to:

input semantic type information corresponding to the semantic block and the first reconstruction value corresponding to the semantic block to a second target filter to obtain the second reconstruction value corresponding to the semantic block.

In this embodiment of this application, the electronic device obtains semantic block information of a picture to be filtered; determines, based on the semantic block information, at least one semantic block included in the picture to be filtered; and performs, for each semantic block by using a filter corresponding to the semantic block, loop filtering processing on a first reconstruction value corresponding to the semantic block, to obtain a second reconstruction value corresponding to the semantic block, where the filter is determined based on the semantic type of the corresponding semantic block. In this embodiment of this application, the semantic block in the picture to be filtered is determined based on the semantic block information of the picture to be filtered. For each semantic block, based on the semantic type corresponding to the semantic block, the filter corresponding to the semantic block is used to perform loop filtering processing on the first reconstruction value corresponding to the semantic block, so as to realize loop filtering of the picture to be filtered. To be specific, in this embodiment of this application, corresponding filters are used to filter semantic blocks of different semantic types, instead of using the same filter to filter, so as to improve the accuracy of picture feature extraction, and further improve the encoding and decoding efficiency in the video compression process.

The loop filtering apparatus provided in this embodiment of this application can implement the processes implemented in the method embodiment of FIG. 3, and a same technical effect can be achieved. To avoid repetition, details are not described herein again.

The loop filtering apparatus in this embodiment of this application may be an electronic device, for example, an electronic device with an operating system, or may be a component in the electronic device, for example, an integrated circuit or a chip. The electronic device may be a terminal, or another device other than the terminal. For example, the terminal may include but is not limited to the foregoing listed types of the terminal. The another device may be a server, a network attached storage (NAS), and the like. This is not specifically limited in this embodiment of this application.

Figure 9:
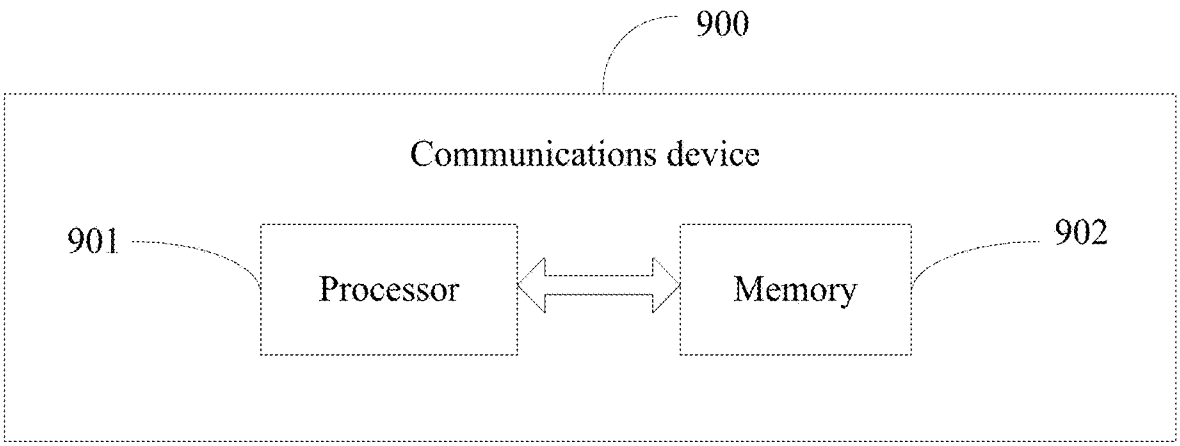
FIG. 9 is a structural diagram of a communications device according to an embodiment of this application.

Optionally, as shown in FIG. 9, an embodiment of this application further provides a communications device 900, including a processor 901 and a memory 902. The memory 902 stores a program or an instruction that can be run on the processor 901. For example, when the communications device 900 is a terminal, the program or the instruction is executed by the processor 901 to implement steps of the foregoing loop filtering method embodiment, and a same technical effect can be achieved.

An embodiment of this application further provides a terminal, including a processor and a communications interface. The processor is configured to perform the following operations:

obtaining semantic block information of a picture to be filtered;

determining, based on the semantic block information, at least one semantic block included in the picture to be filtered; and performing, for each semantic block by using a filter corresponding to the semantic block, loop filtering processing on a first reconstruction value corresponding to the semantic block, to obtain a second reconstruction value corresponding to the semantic block.

Figure 10:
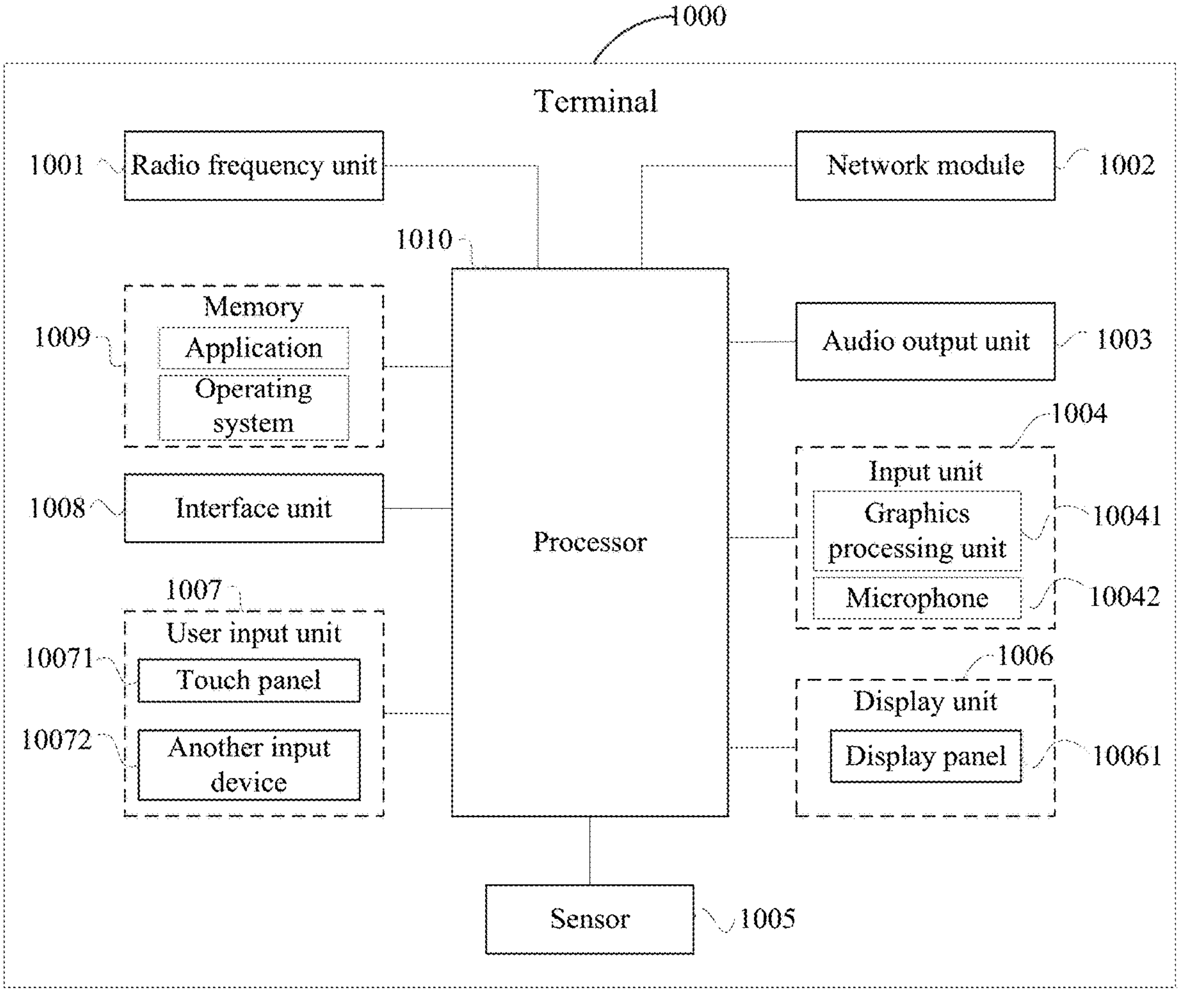
FIG. 10 is a schematic diagram of a hardware structure of a terminal according to an embodiment of this application.

The terminal embodiment is corresponding to the terminal side method embodiment, each implementation process and implementation of the method embodiment can be applied to the terminal embodiment, and a same technical effect can be achieved. Specifically, FIG. 10 is a schematic diagram of a hardware structure of a terminal according to an embodiment of this application.

A terminal 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

A person skilled in the art can understand that the terminal 1000 may further include a power supply (such as a battery) that supplies power to each component. The power supply may be logically connected to the processor 1010 by using a power supply management system, to implement functions such as charging and discharging management, and power consumption management by using the power supply management system. The terminal structure shown in FIG. 10 constitutes no limitation on the terminal, and the terminal may include more or fewer components than those shown in the figure, or combine some components, or have different component arrangements. Details are not described herein.

It should be understood that in this embodiment of this application, the input unit 1004 may include a graphics processing unit (GPU) 10041 and a microphone 10042. The graphics processing unit 10041 processes picture data of a static picture or a video obtained by a picture capture apparatus (for example, a camera) in a video capture mode or a picture capture mode. The display unit 1006 may include a display panel 10061, and the display panel 10061 may be configured in a form of a liquid crystal display, an organic light-emitting diode, or the like. The user input unit 1007 includes at least one of a touch panel 10071 and another input device 10072. The touch panel 10071 is also referred to as a touchscreen. The touch panel 10071 may include two parts: a touch detection apparatus and a touch controller. The another input device 10072 may include but is not limited to a physical keyboard, a functional button (such as a volume control button or a power on/off button), a trackball, a mouse, and a joystick. Details are not described herein.

In this embodiment of this application, after receiving downlink data from a network side device, the radio frequency unit 1001 may transmit the downlink data to the processor 1010 for processing. The radio frequency unit 1001 may send uplink data to the network side device. Generally, the radio frequency unit 1001 includes but is not limited to an antenna, an amplifier, a transceiver, a coupler, a low noise amplifier, a duplexer, and the like.

The memory 1009 may be configured to store a software program or an instruction and various data. The memory 1009 may mainly include a first storage area for storing a program or an instruction and a second storage area for storing data. The first storage area may store an operating system, and an application or an instruction required by at least one function (for example, a sound playing function or a picture playing function). In addition, the memory 1009 may be a volatile memory or a non-volatile memory, or the memory 1009 may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchlink dynamic random access memory (SLDRAM), and a direct rambus random access memory (DRRAM). The memory 1009 in this embodiment of this application includes but is not limited to these memories and any memory of another proper type.

The processor 1010 may include one or more processing units. Optionally, an application processor and a modem processor are integrated into the processor 1010. The application processor mainly processes an operating system, a user interface, an application, or the like. The modem processor mainly processes a wireless communication signal, for example, a baseband processor. It may be understood that, alternatively, the modem processor may not be integrated into the processor 1010.

The processor 1010 is configured to execute the following operations:

obtaining semantic block information of a picture to be filtered;

determining, based on the semantic block information, at least one semantic block included in the picture to be filtered; and performing, for each semantic block by using a filter corresponding to the semantic block, loop filtering processing on a first reconstruction value corresponding to the semantic block, to obtain a second reconstruction value corresponding to the semantic block.

In this embodiment of this application, the electronic device obtains semantic block information of a picture to be filtered; determines, based on the semantic block information, at least one semantic block included in the picture to be filtered; and performs, for each semantic block by using a filter corresponding to the semantic block, loop filtering processing on a first reconstruction value corresponding to the semantic block, to obtain a second reconstruction value corresponding to the semantic block, where the filter is determined based on the semantic type of the corresponding semantic block. In this embodiment of this application, the semantic block in the picture to be filtered is determined based on the semantic block information of the picture to be filtered. For each semantic block, based on the semantic type corresponding to the semantic block, the filter corresponding to the semantic block is used to perform loop filtering processing on the first reconstruction value corresponding to the semantic block, so as to realize loop filtering of the picture to be filtered. To be specific, in this embodiment of this application, corresponding filters are used to filter semantic blocks of different semantic types, instead of using the same filter to filter, so as to improve the accuracy of picture feature extraction, and further improve the encoding and decoding efficiency in the video compression process.

An embodiment of this application further provides a readable storage medium. The readable storage medium stores a program or an instruction. When the program or the instruction is executed by a processor, processes of the foregoing loop filtering method embodiment are implemented, and a same technical effect can be achieved. To avoid repetition, details are not described herein again.

The processor is a processor in the terminal in the foregoing embodiments. The readable storage medium includes a computer-readable storage medium, such as a computer read-only memory (ROM), a random access memory (RAM), a magnetic disk, or an optical disc.

An embodiment of this application further provides a chip. The chip includes a processor and a communications interface, the communications interface is coupled to the processor, and the processor is configured to run a program or an instruction to implement the processes of the foregoing loop filtering method embodiment, and a same technical effect can be achieved. To avoid repetition, details are not described herein again.

It should be understood that the chip mentioned in this embodiment of this application may also be referred to as a system-level chip, a system chip, a chip system, or a system on chip.

An embodiment of this application further provides a computer program product. The computer program product is stored in a storage medium, and the computer program product is executed by at least one processor to implement the processes of the foregoing loop filtering method embodiment, and a same technical effect can be achieved. To avoid repetition, details are not described herein again.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to this process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the implementations of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a computer software product. The computer software product is stored in a storage medium (for example, a ROM/RAM, a floppy disk, or an optical disc), and includes several instructions for instructing a terminal (which may be a mobile phone, a computer, a server, an air conditioner, a network device, or the like) to perform the methods described in the embodiments of this application.

The embodiments of this application are described above with reference to the accompanying drawings, but this application is not limited to the foregoing specific implementations, and the foregoing specific implementations are only illustrative and not restrictive. Under the enlightenment of this application, a person of ordinary skill in the art can make many forms without departing from the purpose of this application and the protection scope of the claims, all of which fall within the protection of this application.

What is claimed is:

1. A loop filtering method, comprising:

obtaining, by an electronic device, semantic block information of a picture to be filtered;

determining, based on the semantic block information, at least one semantic block comprised in the picture to be filtered; and performing, for each semantic block by obtaining a semantic type corresponding to the semantic block, determining a filter corresponding to the semantic block based on the semantic type and using the filter corresponding to the semantic block, loop filtering processing on a first reconstruction value corresponding to the semantic block, to obtain a second reconstruction value corresponding to the semantic block.

2. The method according to claim 1, wherein the semantic block information comprises first size information, and the determining, based on the semantic block information, at least one semantic block comprised in the picture to be filtered comprises:

obtaining at least one picture block by partitioning the picture to be filtered, wherein a size of the picture block is the same as a size represented by the first size information; and determining the picture block as the semantic block.

3. The method according to claim 2, wherein the semantic block information further comprises second size information associated with a first picture block, and after the obtaining at least one picture block, the method further comprises:

obtaining sub-blocks by partitioning the first picture block, wherein a size of the sub-block is greater than or equal to a size represented by the second size information; and determining the sub-block as the semantic block.

4. The method according to claim 3, wherein the semantic block information further comprises N-branch tree partition manner associated with the first picture block, and the obtaining sub-blocks by partitioning the first picture block comprises:

partitioning the first picture block by using the N-branch tree partition manner until a partition depth corresponding to the sub-block obtained by partition is the same as a preset partition depth.

5. The method according to claim 1, wherein in a case that the electronic device is a decoding end, the obtaining semantic block information of a picture to be filtered comprises:

obtaining a semantic information bitstream, wherein the semantic information bitstream is a data stream encoding semantic block information of an original picture corresponding to the picture to be filtered; and parsing the semantic information bitstream to obtain semantic block information of the picture to be filtered.

6. The method according to claim 1, wherein in a case that the electronic device is an encoding end, the obtaining semantic block information of a picture to be filtered comprises:

obtaining an original picture, wherein the original picture is a picture obtained in a case that the picture to be filtered is not preprocessed; and performing semantic segmentation processing on the original picture to determine semantic block information of the original picture, wherein the semantic block information of the original picture is the same as the semantic block information of the picture to be filtered.

7. The method according to claim 1, wherein the performing, by using a filter corresponding to the semantic block, loop filtering processing on a first reconstruction value corresponding to the semantic block, to obtain a second reconstruction value corresponding to the semantic block comprises:

performing, by using a first target filter, loop filtering processing on a first reconstruction value corresponding to the semantic block, to obtain a second reconstruction value corresponding to the semantic block, wherein the first target filter is associated with the picture to be filtered.

8. The method according to claim 1, wherein before the performing, for each semantic block by using a filter corresponding to the semantic block, loop filtering processing on a first reconstruction value corresponding to the semantic block, to obtain a second reconstruction value corresponding to the semantic block, the method further comprises:

obtaining scenario information corresponding to the picture to be filtered and a semantic type and position information corresponding to each semantic block; and determining a filter and a first reconstruction value corresponding to the semantic block, wherein the filter is determined based on the scenario information and the semantic type, and the first reconstruction value is a reconstruction value of a pixel represented by the position information in the picture to be filtered.

9. The method according to claim 1, wherein the performing, by using a filter corresponding to the semantic block, loop filtering processing on a first reconstruction value corresponding to the semantic block, to obtain a second reconstruction value corresponding to the semantic block comprises:

in a case that the semantic type of the semantic block is a first semantic type, performing, by using a first filter corresponding to the semantic block, loop filtering processing on a first reconstruction value corresponding to the semantic block, to obtain a second reconstruction value corresponding to the semantic block, wherein the first semantic type is a single semantic type.

10. The method according to claim 9, wherein the first filter is a filter trained based on a first training picture, and the first training picture comprises training pictures with the same semantic type.

11. The method according to claim 1, wherein the performing, by using a filter corresponding to the semantic block, loop filtering processing on a first reconstruction value corresponding to the semantic block, to obtain a second reconstruction value corresponding to the semantic block comprises:

in a case that the semantic type of the semantic block is a second semantic type, performing, by using a second filter corresponding to the semantic block, loop filtering processing on a first reconstruction value corresponding to the semantic block, to obtain a second reconstruction value corresponding to the semantic block, wherein the second semantic type is a hybrid semantic type.

12. The method according to claim 11, wherein the second filter is a filter trained based on a second training picture, and the second training picture comprises training pictures with different semantic types.

13. The method according to claim 1, wherein the obtaining semantic block information of a picture to be filtered comprises:

obtaining a filter identifier corresponding to the picture to be filtered; and in a case that the filter identifier is a preset identifier, obtaining the semantic block information of the picture to be filtered.

14. The method according to claim 1, wherein the filter comprises a third filter and a fourth filter, and the performing, by using a filter corresponding to the semantic block, loop filtering processing on a first reconstruction value corresponding to the semantic block, to obtain a second reconstruction value corresponding to the semantic block comprises:

performing, by using the third filter, loop filtering processing on the first reconstruction value, to obtain a third reconstruction value; and performing, by using the fourth filter, loop filtering processing on the third reconstruction value, to obtain the second reconstruction value, wherein the third filter or the fourth filter is determined based on the semantic type of the semantic block.

15. The method according to claim 1, wherein the performing, by using a filter corresponding to the semantic block, loop filtering processing on a first reconstruction value corresponding to the semantic block, to obtain a second reconstruction value corresponding to the semantic block comprises:

inputting semantic type information corresponding to the semantic block and the first reconstruction value corresponding to the semantic block to a second target filter to obtain the second reconstruction value corresponding to the semantic block, wherein the second target filter is a preset neural network filter, and the semantic type information is used to represent a semantic type of a corresponding semantic block.

16. A terminal, comprising a processor implemented in hardware and a memory, wherein the memory stores a program or an instruction executable by the processor, wherein the program or the instruction, when executed by the processor of the terminal, causes the terminal to perform:

obtaining semantic block information of a picture to be filtered;

determining, based on the semantic block information, at least one semantic block comprised in the picture to be filtered; and performing, for each semantic block by obtaining a semantic type corresponding to the semantic block, determining a filter corresponding to the semantic block based on the semantic type and using the filter corresponding to the semantic block, loop filtering processing on a first reconstruction value corresponding to the semantic block, to obtain a second reconstruction value corresponding to the semantic block.

17. The terminal according to claim 16, wherein the semantic block information comprises first size information, and when determining, based on the semantic block information, at least one semantic block comprised in the picture to be filtered, the program or the instruction, when executed by the processor of the terminal, causes the terminal to perform:

obtaining at least one picture block by partitioning the picture to be filtered, wherein a size of the picture block is the same as a size represented by the first size information; and determining the picture block as the semantic block.

18. A non-transitory computer-readable storage medium, wherein the non-transitory readable storage medium stores a program or an instruction, wherein the program or the instruction, when executed by a processor of an electronic device, causes the electronic device to perform:

obtaining semantic block information of a picture to be filtered;

determining, based on the semantic block information, at least one semantic block comprised in the picture to be filtered; and performing, for each semantic block by obtaining a semantic type corresponding to the semantic block, determining a filter corresponding to the semantic block based on the semantic type and using the filter corresponding to the semantic block, loop filtering processing on a first reconstruction value corresponding to the semantic block, to obtain a second reconstruction value corresponding to the semantic block.

19. A chip, comprising a processor implemented in hardware and a communications interface, wherein the communications interface is coupled to the processor, and the processor is configured to run a program or an instruction to implement-steps of the loop filtering method according to claim 1.

20. A computer program product, wherein the computer program product is stored in a non-volatile computer-readable storage medium, and the computer program product is executed by at least one processor to implement-steps of the loop filtering method according to claim 1.

* * * * *